(12) United States Patent
Maruyama et al.

(10) Patent No.: US 12,463,339 B2
(45) Date of Patent: Nov. 4, 2025

(54) PHASED ARRAY ANTENNA CALIBRATION METHOD AND PHASED ARRAY ANTENNA CALIBRATION SYSTEM

(71) Applicant: Mitsubishi Electric Corporation, Tokyo (JP)

(72) Inventors: Takashi Maruyama, Tokyo (JP); Shigeo Udagawa, Tokyo (JP); Mitsuru Kirita, Tokyo (JP); Tai Tanaka, Tokyo (JP); Ryotaro Ohashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 307 days.

(21) Appl. No.: 18/025,644

(22) PCT Filed: Sep. 30, 2020

(86) PCT No.: PCT/JP2020/037312
§ 371 (c)(1),
(2) Date: Mar. 10, 2023

(87) PCT Pub. No.: WO2022/070355
PCT Pub. Date: Apr. 7, 2022

(65) Prior Publication Data
US 2023/0361463 A1    Nov. 9, 2023

(51) Int. Cl.
*H01Q 3/26* (2006.01)
*H01Q 3/36* (2006.01)

(52) U.S. Cl.
CPC ............... *H01Q 3/267* (2013.01); *H01Q 3/36* (2013.01)

(58) Field of Classification Search
CPC .................................. H01Q 3/267; H01Q 3/36
(Continued)

(56) References Cited

U.S. PATENT DOCUMENTS

2012/0146841 A1   6/2012   Ookawa
2018/0198214 A1*  7/2018   Walker ................. H01Q 21/061

FOREIGN PATENT DOCUMENTS

JP    57-162803 A    10/1982
JP    2010-41577 A    2/2010
(Continued)

OTHER PUBLICATIONS

International Search Report and Written Opinion mailed on Dec. 22, 2020, received for PCT Application PCT/JP2020/037312, filed on Sep. 30, 2020, 19 pages including English Translation.

*Primary Examiner* — Harry K Liu
(74) *Attorney, Agent, or Firm* — XSENSUS LLP

(57) ABSTRACT

A method for calibrating a phased array antenna is provided. The phased array antenna includes multiple transmission modules each including a phase shifter that changes a phase of a high frequency signal output from a signal source, an amplifier that amplifies an amplitude of the high frequency signal, and a transmission antenna that converts the high frequency signal into a radio wave, and a reception module including a reception antenna. The method includes a step of receiving, by the reception antenna, a reflected wave that is a radio wave transmitted from the transmission antenna of each of the multiple transmission modules and reflected outside the phased array antenna, and a step of adjusting the phase shifter and the amplifier of each of the multiple transmission modules based on an amplitude and a phase of the reflected wave received.

3 Claims, 8 Drawing Sheets

(58) Field of Classification Search
USPC .......................................................... 342/367
See application file for complete search history.

(56) References Cited

FOREIGN PATENT DOCUMENTS

JP          2012-124749 A     6/2012
WO    WO-2017132539 A1 *  8/2017  ........... G01C 21/165

* cited by examiner

PHASED ARRAY ANTENNA CALIBRATION METHOD AND PHASED ARRAY ANTENNA CALIBRATION SYSTEM

CROSS-REFERENCE TO RELATED APPLICATION

The present application is based on PCT filing PCT/JP2020/037312, filed Sep. 30, 2020, the entire contents of which are incorporated herein by reference.

FIELD

The present disclosure relates to a phased array antenna calibration method and to a phased array antenna calibration system that each allow radio waves transmitted from respective multiple antennas of a phased array antenna to have a same amplitude and coordinated phases.

BACKGROUND

A phased array antenna including multiple antennas controls an electric field vector on a per-antenna basis to change the direction of the resultant electric field vector, which is obtained by combining electric field vectors of the respective antennas. This enables any radiation direction property to be obtained, that is, this enables a radio wave to be transmitted in a particular direction and a radio wave transmitted from a particular direction to be received.

In general, in an initial state, respective high frequency signals not having a same amplitude or coordinated phases due to different wire lengths and due to a manufacturing error are input to respective antennas of a phased array antenna. Accordingly, radio waves transmitted from the respective antennas also do not have a same amplitude or coordinated phases. This requires "calibration" to arrange the radio waves transmitted from the respective antennas to have a same amplitude and coordinated phases.

When a component or a device other than a phased array antenna is used for calibration of the phased array antenna, these component and device and the phased array antenna together constitute a calibration measurement system for the phased array antenna.

Patent Literature 1 discloses a method for calibrating a phased array antenna for use in a calibration measurement system including a transmitter in addition to the phased array antenna, based on a result of reception, by the phased array antenna, of a radio wave transmitted from the transmitter through air space.

CITATION LIST

Patent Literature

Patent Literature 1: Japanese Patent Application Laid-open No. S57-162803

SUMMARY

Technical Problem

The phased array antenna calibration method disclosed in Patent Literature 1 requires a transmitter in addition to the phased array antenna to be calibrated, thereby making the calibration measurement system complex.

The present disclosure has been made in view of the foregoing, and it is an object of the present disclosure to provide a phased array antenna calibration method that allows accurate calibration to be performed using a simply configured calibration measurement system.

Solution to Problem

To solve the problem and achieve the object described above, a phased array antenna calibration method according to the present disclosure is a phased array antenna calibration method for a phased array antenna including multiple transmission modules and a reception module, where the multiple transmission modules each include a phase shifter that changes a phase of a high frequency signal output from a signal source, an amplifier that amplifies an amplitude of the high frequency signal, and a transmission antenna that converts the high frequency signal into a radio wave, and the reception module includes a reception antenna. A phased array antenna calibration method according to the present disclosure includes a step of receiving, by the reception antenna, a reflected wave that is a radio wave transmitted from the transmission antenna of each of the multiple transmission modules and reflected outside the phased array antenna, and a step of adjusting the phase shifter and the amplifier of each of the multiple transmission modules based on an amplitude and a phase of the reflected wave received.

Advantageous Effects of Invention

A phased array antenna calibration method according to the present disclosure provides an advantage in allowing accurate calibration to be performed using a simply configured calibration measurement system.

DESCRIPTION OF EMBODIMENTS

A phased array antenna calibration method and a phased array antenna calibration system according to embodiments will be described in detail below with reference to the drawings.

First Embodiment

Figure 1:
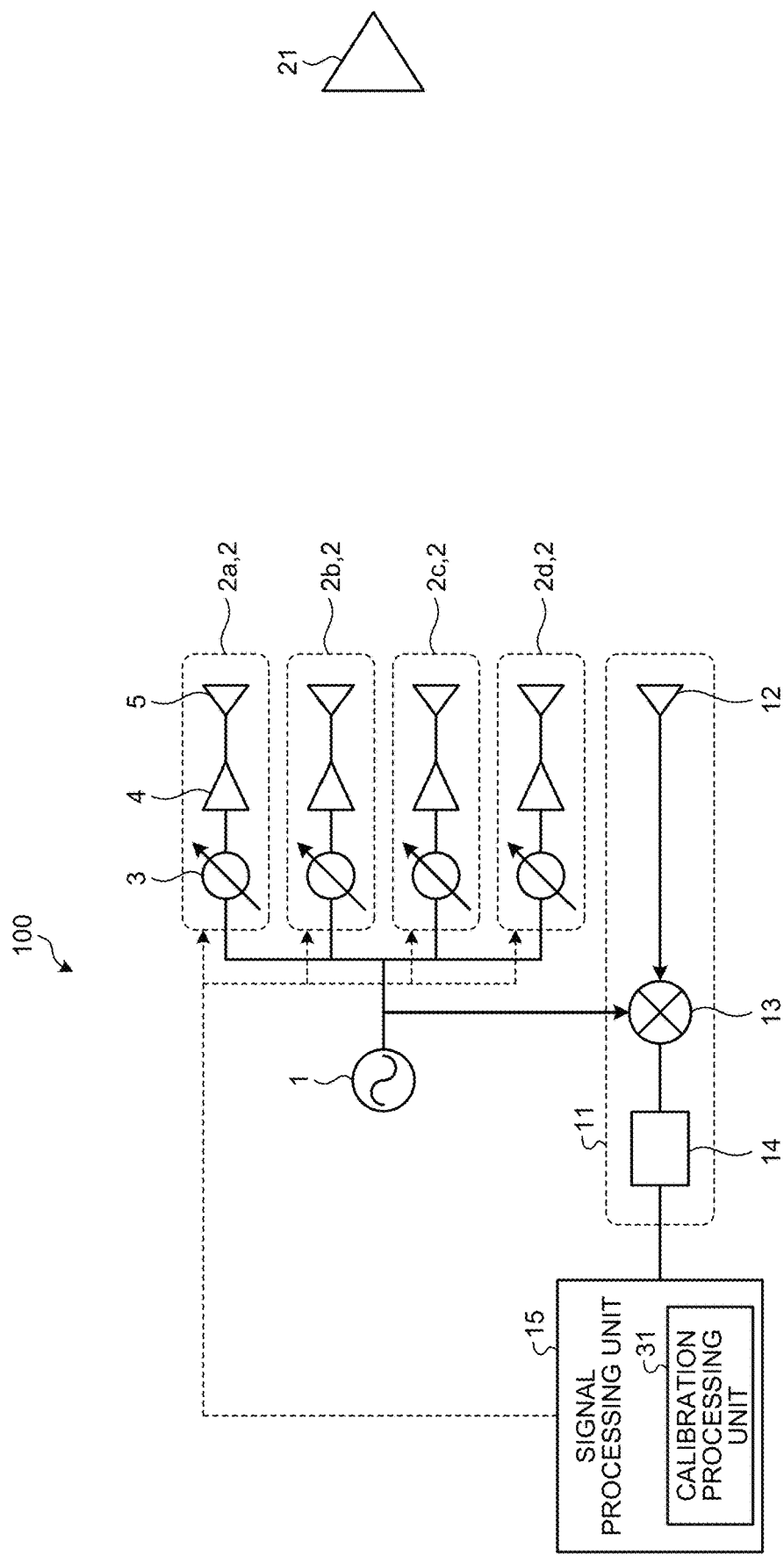
FIG. 1 is a diagram illustrating a phased array antenna calibration measurement system according to a first embodiment.

FIG. 1 is a diagram illustrating a calibration measurement system for a phased array antenna (hereinafter also referred to as phased array antenna calibration measurement system) according to a first embodiment. A calibration measurement system for a phased array antenna 100 includes the phased array antenna 100 to be calibrated and a reflector 21 which reflects a high frequency signal. The phased array antenna 100 and the reflector 21 together constitute a calibration system for calibrating the phased array antenna 100. It is sufficient that the reflector 21 be provided only during calibration of the phased array antenna 100.

The phased array antenna 100 includes a signal source 1, which outputs a high frequency signal, transmission modules 2, a reception module 11, and a signal processing unit 15. The phased array antenna 100 includes four of the transmission modules 2. The four transmission modules 2 may hereinafter be individually denoted as transmission modules 2a, 2b, 2c, and 2d for distinction. Note that the following description will be given in the context of the phased array antenna 100 including four of the transmission modules 2 by way of example, but it is sufficient that the phased array antenna 100 include two or more of the transmission modules 2, and the number of the transmission modules 2 is not limited to four. The transmission modules 2 can be installed in an arrangement pattern such as a linear array, a planar array, or a circular array, but the arrangement pattern is not limited to a specific arrangement pattern. The transmission modules 2a, 2b, 2c, and 2d each include a phase shifter 3, an amplifier 4, and a transmission antenna 5. The phase shifter 3 is capable of changing the phase of the high frequency signal input from the signal source 1 to any phase, and outputting the resulting high frequency signal. The amplifier 4 is capable of changing the output voltage of the high frequency signal input from the phase shifter 3 to any voltage, and outputting the resulting high frequency signal to the transmission antenna 5. That is, the amplifier 4 is capable of changing the amplitude of the high frequency signal to any amplitude. The reception module 11 includes a reception antenna 12, a mixer 13, and a receiver 14.

The signal processing unit 15 performs operation such as calculation of a target location, a moving direction, and a moving speed. The signal processing unit 15 includes a calibration processing unit 31, which estimates the amplitude and phase provided by each of the transmission modules 2a, 2b, 2c, and 2d, adjusts the phase of the high frequency signal output from the phase shifter 3, and adjusts the amplitude of the high frequency signal output from the amplifier 4. The phase shifter 3 and the amplifier 4 of each of the transmission modules 2 are adjusted by the calibration processing unit 31.

The reflector 21 may be of any type that reflects a high frequency signal transmitted thereto. An example of the reflector 21 is a corner reflector having a retroreflective property.

An operation of transmitting a radio wave by the phased array antenna 100 will now be described. The signal source 1 outputs a high frequency signal. The high frequency signal output from the signal source 1 undergoes adjustment of the phase thereof in the phase shifter 3, undergoes adjustment of the amplitude of the power thereof in the amplifier 4, and is then transmitted to the transmission antenna 5. The high frequency signal input to the transmission antenna 5 is converted into a radio wave, and the radio wave is transmitted from the transmission antenna 5. The following description describes an operation of transmission of a radio wave from the transmission antenna 5 of one of the transmission modules 2 as "a radio wave is transmitted from the transmission module 2". In addition, the following description describes the amplitude of a radio wave transmitted from the transmission antenna 5 as "amplitude provided by the transmission module 2". Moreover, the following description describes the phase of a radio wave transmitted from the transmission antenna 5 as "phase provided by the transmission module 2".

Since the phased array antenna 100 includes the multiple transmission modules 2, the phased array antenna 100 can change the direction of the resultant electric field vector obtained by combining the electric field vectors of the respective transmission antennas 5, by adjusting the amplitude and phase provided by each of the transmission modules 2, and can thus change the radiation direction property of the phased array antenna 100.

However, the phase shifter 3, the amplifier 4, the transmission antenna 5, and wires connecting therebetween vary from one to another of the transmission modules 2. The amplitude and phase provided by each of the transmission modules 2a, 2b, 2c, and 2d are thus unknown before calibration of the phased array antenna 100.

Accordingly, operation of the phased array antenna 100 requires "calibration", which includes estimation of the amplitude and phase provided by each of the transmission modules 2a, 2b, 2c, and 2d, and adjustment of the amplitude and phase provided by each of the transmission modules 2a, 2b, 2c, and 2d based on an estimation result.

Calibration of the phased array antenna 100 will next be described. The radio waves transmitted from the transmission modules 2 are reflected by the reflector 21. The reception antenna 12 receives radio waves reflected by the reflector 21. The mixer 13 multiplies a high frequency signal resulting from conversion of a radio wave by the reception antenna 12 upon reception of the radio wave, by the high frequency signal directly output from the signal source 1 thus to provide frequency modulation, and then outputs a baseband signal. The receiver 14 converts the baseband signal into a digital signal. The signal processing unit 15 stores the baseband signal that has been converted into a digital signal by the receiver 14, and performs various types of signal processing on the baseband signal that has been converted into a digital signal to perform operation such as calculation of a target location, a moving direction, and a moving speed. The following description describes a sequence of operation in which a radio wave is received by the reception antenna 12 of the reception module 11, undergoes frequency modulation in the mixer 13, and is converted into a digital signal in the receiver 14 simply as "a radio wave is received by the reception module 11".

The calibration processing unit 31 determines the amplitude and phase of the radio wave received by the reception module 11 based on the amplitude and phase of the digital signal input to the signal processing unit 15, and estimates the amplitude and phase provided by each of the transmission modules 2a, 2b, 2c, and 2d. Thus, by changing of settings of the phase shifter 3 and of the amplifier 4 of each of the transmission modules 2a, 2b, 2c, and 2d by the calibration processing unit 31 based on the amplitude and phase of the digital signal input to the signal processing unit 15, the amplitude and phase provided by each of the transmission modules 2a, 2b, 2c, and 2d can be adjusted, and the phased array antenna 100 can thus be calibrated.

As described above, calibration of the phased array antenna 100 according to the first embodiment is performed through a step of receiving, by the reception antenna 12, a reflected wave, which is a radio wave transmitted from the transmission antenna 5 of each of the multiple transmission modules 2a, 2b, 2c, 2d and reflected outside the phased array antenna 100; and a step of adjusting the phase shifter 3 and the amplifier 4 of each of the multiple transmission modules 2a, 2b, 2c, 2d based on the amplitude and phase of each of the reflected waves received. Owing to the use of the reception module 11 included in the phased array antenna 100 itself in calibration of the phased array antenna 100, transmission and reception of a radio wave performed for the calibration are completed in the phased array antenna 100, thereby simplifying the configuration and control of the calibration measurement system. Note that the settings of the phase shifter 3 and of the amplifier 4 may be changed manually for adjustment of the amplitude and phase provided by each of the transmission modules 2a, 2b, 2c, and 2d.

The phased array antenna 100 may be calibrated in any manner. In the following description, a specific example of calibration will be described assuming that the method is used that is described in "Mano and Katagi, Fēzudo Arei Antena no Soshi Shimpuku Isō Sokuteihō—Soshi Denkai Bekutoru Kaitenhō (English equivalent: Method for Measuring Amplitude and Phase of Phased Array Antenna Elements—Rotating-Element Electric Field Vector Method), Institute of Electronics, Information and Communication Engineers (IEICE) Transaction B, Vol. J 65-B, No. 5, pp. 555-560, May 1982".

First, an output from the amplifier 4 of each of all of the transmission modules 2 is set as an initial value. One example thereof is a same specified value for all the transmission modules 2. In addition, a phase of the phase shifter 3 of each of all of the transmission modules 2 is set as an initial value. One example thereof is 0° for all the phase shifters 3, but another value may be used. After setting the initial values in the amplifier 4 and the phase shifter 3 of each of all of the transmission modules 2, a radio wave is output from all the transmission modules 2. As described above, the phase shifter 3, the amplifier 4, the transmission antenna 5, and wires connecting therebetween vary from one to another of the transmission modules 2. The amplitude and phase of the radio wave transmitted from each of the transmission modules 2 are unknown at this moment.

The radio waves reflected by the reflector 21 are received by the reception module 11. The magnitude of received power of the digitized signal generated from the baseband signal resulting from conversion of each of the radio waves received by the reception module 11 is stored in the signal processing unit 15.

Next, the phase state of the phase shifter 3 of one transmission module 2 to be focused on among the transmission modules 2 (hereinafter, simply the transmission module 2 to be focused on) is changed. When the phase shifter 3 is a digital phase shifter, the phase is shifted by one bit. A radio wave is then transmitted from all the transmission modules 2. The radio waves reflected by the reflector 21 are received by the reception module 11. The magnitude of received power of the baseband signal resulting from conversion of each of the radio waves received by the reception module 11 is stored in the signal processing unit 15.

As described above, a sequence of operation is repeated until the magnitude of received power is stored in the signal processing unit 15 for all the phase states of the phase shifter 3, where the sequence of operation includes changing of the phase state of the phase shifter 3 of the transmission module 2 to be focused on, transmission and reception of the radio wave, and storage of the magnitude of received power in the signal processing unit 15. When the phase shifter 3 is a digital phase shifter, the sequence of operation is repeated until the magnitude of received power is stored in the signal processing unit 15 for all bit combinations.

The magnitude of received power stored in the signal processing unit 15 changes according to a cosine curve during one cycle of change in the phase state of the phase shifter 3 of the transmission module 2 to be focused on. During this operation, the output of each of the other ones of the transmission modules 2 than the transmission module 2 to be focused on remains the initial value. Accordingly, when a change is made for one cycle in the phase state of the phase shifter 3 of the transmission module 2 to be focused on, the change in the phase of the received power is only due to the phase state of the phase shifter 3 of the transmission module 2 to be focused on. This enables the calibration processing unit 31 to estimate the amplitude and phase of the radio wave transmitted from the transmission module 2 to be focused on, based on the value of the phase corresponding to the maximum received power stored in the signal processing unit 15, and on the magnitude of variation in power.

Solutions of the amplitude and phase are expressed by $k_1$, $k_2$, $X_1$, and $X_2$ below, where $k_1$ and $k_2$ are relative amplitudes, and $X_1$ and $X_2$ are relative phases, provided by the transmission module 2 to be focused on.

$$k_1 = \frac{p}{\sqrt{1 + 2p \cos\Delta_0 + p^2}} \quad \text{[Formula 1]}$$

$$X_1 = \tan^{-1}\left(\frac{\sin\Delta_0}{\cos\Delta_0 + p}\right)$$

$$k_2 = \frac{p}{\sqrt{1 + 2p \cos\Delta_0 + p^2}}$$

$$X_2 = \tan^{-1}\left(\frac{\sin\Delta_0}{\cos\Delta_0 + 1/p}\right)$$

Note that $p=(r-1)/(r+1)$. A value $r^2$ is the ratio between the maximum value and the minimum value of the cosine curve representing the magnitude of received power stored in the signal processing unit 15, and a value $-\Delta_0$ is the value of the phase when the cosine curve representing the magnitude of received power is at the maximum. The values $r^2$ and $-\Delta_0$ can be obtained from observation values.

A positive value of "r" allows a pair of $k_1$ and $X_1$ to be determined, while a negative value of "r" allows a pair of $k_2$ and $X_2$ to be determined. This requires determination whether the pair of $k_1$ and $X_1$ is the right solution or the pair of $k_2$ and $X_2$ is the right solution. This determination can be made using a known method. One example of known method is to change the phase distribution of initial setting and make another determination again to calculate the relative amplitudes and relative phases, and then select a solution that produces a same relative amplitude as compared to the first result. This method allows determination of whether the pair of $k_1$ and $X_1$ is the right solution or the pair of $k_2$ and $X_2$ is the right solution. Determination of whether the pair of $k_1$ and $X_1$ is the right solution or the pair of $k_2$ and $X_2$ is the right solution may be made using another known method different from the above exemplified method.

After the estimation of the amplitude and phase provided by the transmission module 2 to be focused on, the calibration processing unit 31 selects another one of the transmission modules 2 whose amplitude and phase are not yet estimated, as the transmission module 2 to be focused on, and then performs the foregoing operation to estimate the amplitude and phase. The calibration processing unit 31 repeats the foregoing operation until the amplitude and phase are estimated for all the transmission modules 2 while sequentially changing the transmission module 2 to be focused on. By performing the foregoing procedure on all the transmission modules 2, the calibration processing unit 31 can estimate the amplitude and phase provided by all of the transmission modules 2.

The calibration processing unit 31 adjusts the phase shifter 3 and the amplifier 4 of each of the transmission modules 2a, 2b, 2c, and 2d based on the estimation results of the amplitude and phase provided by each of the transmission modules 2a, 2b, 2c, and 2d. Adjustment by the calibration processing unit 31 with respect to the phase shifter 3 and the amplifier 4 of each of the transmission modules 2a, 2b, 2c, and 2d enables the electric field vector of each of the transmission antennas 5 to be directed to any direction, thereby enabling the radiation direction property of the phased array antenna 100 to be arbitrarily set. For example, adjustment of the phase shifter 3 and the amplifier 4 to provide a same amplitude and a same phase in all the transmission modules 2a, 2b, 2c, and 2d enables a beam to be formed in a direction perpendicular to the array plane of the phased array antenna 100.

Note that the amplitude of the radio wave transmitted from each of the transmission modules 2 may be estimated by performing, on all the transmission modules 2, a procedure of transmitting a radio wave from only a single one of the transmission modules 2, and measuring, by the reception module 11, the power of the radio wave reflected by the reflector 21.

The method for calibrating the phased array antenna 100 according to the first embodiment includes a step of receiving, by the reception antenna 12, a reflected wave of the radio wave transmitted from the transmission antenna 5 of each of the multiple transmission modules 2a, 2b, 2c, 2d, and a step of adjusting the phase shifter 3 and the amplifier 4 of each of the multiple transmission modules 2a, 2b, 2c, 2d based on the amplitude and phase of each of the reflected waves received. The radio waves are transmitted and received by using the transmission modules 2 and the reception module 11 included in the phased array antenna 100, and the amplitudes and phases provided by the transmission modules 2 are estimated by using the radio waves traveling to and back from the reflector 21. This enables the phased array antenna 100 according to the first embodiment to perform more accurate calibration while using a simply configured calibration measurement system.

Second Embodiment

A calibration measurement system for the phased array antenna 100 according to a second embodiment is similar to that of the first embodiment except that, in the second embodiment, the signal source 1 outputs a high frequency signal that is a chirp signal, whose frequency varies with time.

During calibration, the high frequency signal output from the signal source 1 is converted into radio waves, and the radio waves are transmitted from the respective transmission modules 2, and are then reflected by the reflector 21.

Each of the radio waves reflected by the reflector 21 is received by the reception antenna 12. The mixer 13 receives the high frequency signal received by the reception antenna 12 and the high frequency signal directly input from the signal source 1. In this operation, the high frequency signal input from the reception antenna 12 into the mixer 13 is a signal propagated in air via the reflector 21, and thus has a phase lag with respect to the high frequency signal directly input from the signal source 1. Because the high frequency signal output from the signal source 1 is a chirp signal, the two high frequency signals input into the mixer 13 having different phases have different frequencies from each other.

Figure 2:
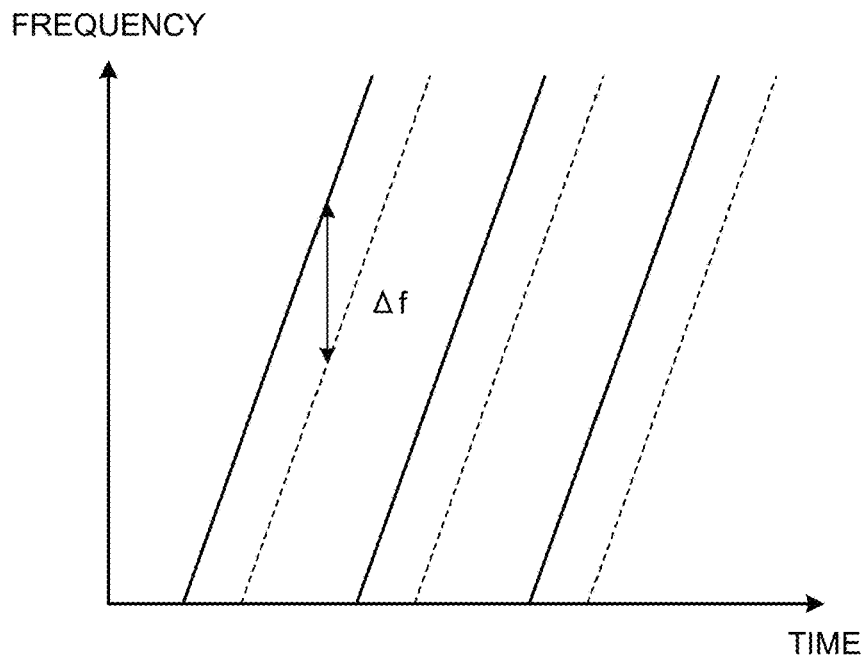
FIG. 2 is a diagram illustrating the frequencies of high frequency signals in a phased array antenna calibration measurement system according to a second embodiment.

FIG. 2 is a diagram illustrating the frequencies of the high frequency signals in the phased array antenna calibration measurement system according to the second embodiment. The symbol $\Delta f$ in FIG. 2 represents the frequency difference between the frequencies of the high frequency signal received by the reception antenna 12 and of the high frequency signal directly input from the signal source 1. Due to a difference in the path length, the two high frequency signals input into the mixer 13, which were output from the signal source 1 at different times, differ in frequency.

The mixer 13 outputs a baseband signal indicating the frequency difference $\Delta f$ of the two signals. The value of the frequency difference $\Delta f$ is proportional to the distance between the reflector 21 and the phased array antenna 100. The receiver 14 converts the baseband signal into a digital signal. The signal processing unit 15 performs various types of signal processing on the digital signal resulting from conversion performed by the receiver 14. The signal processing unit 15 calculates the frequency spectrum of this digital signal, and stores the magnitude of power at the frequency corresponding to the distance between the reflector 21 and the phased array antenna 100.

Figure 3:
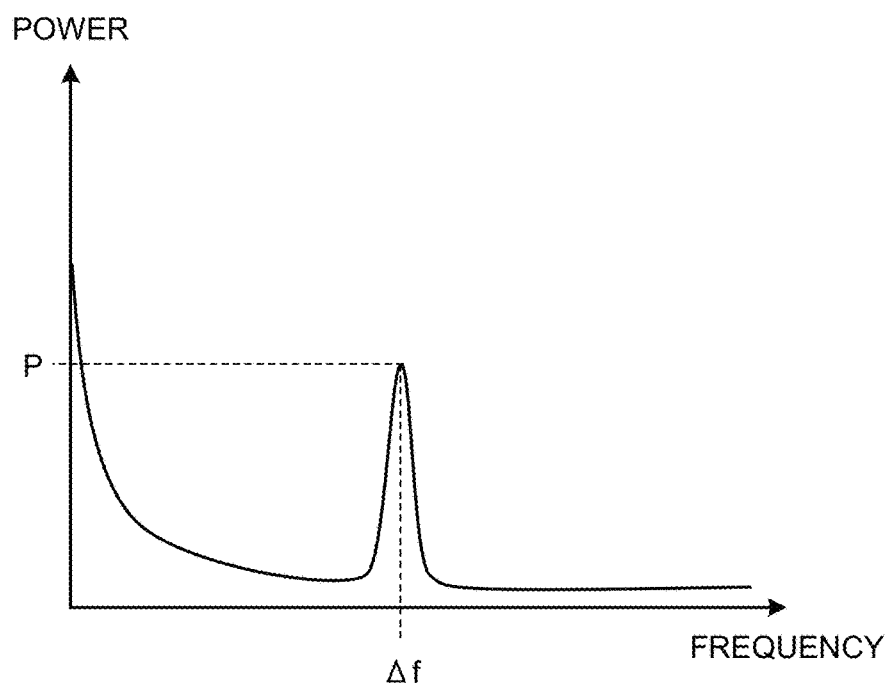
FIG. 3 is a diagram illustrating a first example of frequency spectrum of a digital signal resulting from conversion performed by a receiver included in the phased array antenna calibration measurement system according to the second embodiment.

FIG. 3 is a diagram illustrating a first example of frequency spectrum of the digital signal resulting from conversion performed by the receiver included in the phased array antenna calibration measurement system according to the second embodiment. The digital signal resulting from conversion performed by the receiver 14 in the second embodiment has a frequency component of the frequency difference $\Delta f$, thereby causing the frequency spectrum to show a local maximum power value P at the frequency $\Delta f$ when a Fourier transform is performed on this digital signal to obtain frequency components. Since the frequency $\Delta f$ is a frequency proportional to the distance between the reflector 21 and the phased array antenna 100, use of the local maximum power value P occurring at the frequency $\Delta f$ during the calibration of the phased array antenna 100 by the calibration processing unit 31 enables removal of a noise component caused by a frequency component other than the frequency corresponding to the distance between the reflector 21 and the phased array antenna 100, thereby enabling calibration accuracy to be improved.

Figure 4:
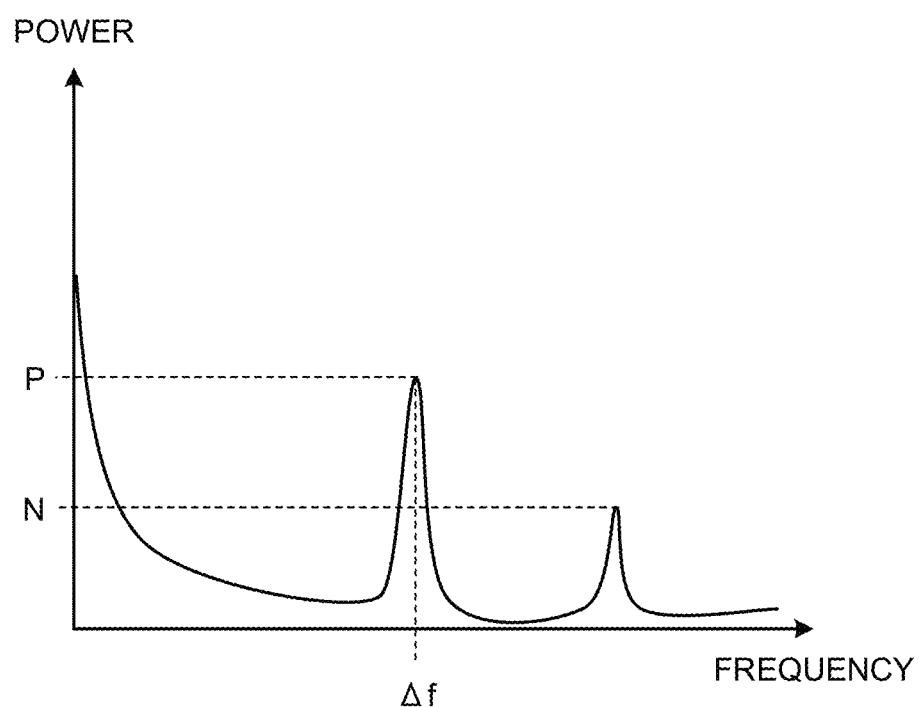
FIG. 4 is a diagram illustrating a second example of frequency spectrum of the digital signal resulting from conversion performed by the receiver included in the phased array antenna calibration measurement system according to the second embodiment.

FIG. 4 is a diagram illustrating a second example of frequency spectrum of the digital signal resulting from conversion performed by the receiver included in the phased array antenna calibration measurement system according to the second embodiment. The frequency spectrum shows another local maximum power value N as well as the local maximum power value P at the frequency Δf, which corresponds to the distance between the reflector 21 and the phased array antenna 100.

When the calibration is performed in an electromagnetic anechoic chamber, only a local maximum value corresponding to the reflector 21 occurs. However, in a case where there is a reflecting object other than the reflector 21 in the electromagnetic anechoic chamber, or in a case where the calibration is performed outside an electromagnetic anechoic chamber, an unwanted local maximum value such as the local maximum power value N of FIG. 4 may appear. Note that although FIG. 4 illustrates a single unwanted local maximum value, there may be two or more unwanted local maximum values. Also in such case, use of the local maximum power value P at the frequency Δf corresponding to the distance to the reflector 21 in the calibration enables removal of a noise component caused by a frequency component other than the frequency corresponding to the distance between the reflector 21 and the phased array antenna 100, thereby enabling calibration accuracy to be improved.

Note that since the distance between the phased array antenna 100 and the reflector 21 is known, the frequency Δf that is determined based on the distance between the phased array antenna 100 and the reflector 21 is also known. Accordingly, calibration may be performed by determining the frequency Δf from the distance between the phased array antenna 100 and the reflector 21, and using the magnitude of power at the frequency Δf in the frequency spectrum in calibration. In this case, it does not matter whether the power at the frequency Δf is at a local maximum.

The phased array antenna 100 may be calibrated in any manner. The phased array antenna 100 can be calibrated using a procedure similar to the procedure of the first embodiment when the method is used that is described in "Mano and Katagi, Fĕzudo Arei Antena no Soshi Shimpuku Isō Sokuteihō—Soshi Denkai Bekutoru Kaitenhō (English equivalent: Method for Measuring Amplitude and Phase of Phased Array Antenna Elements—Rotating-Element Electric Field Vector Method), Institute of Electronics, Information and Communication Engineers (IEICE) Transaction B, Vol. J65-B, No. 5, pp. 555-560, May 1982".

The method for calibrating the phased array antenna 100 according to the second embodiment uses the phased array antenna 100 itself as well as transmission and reception functions thereof, and uses radio waves traveling to and back from the reflector 21. This enables the phased array antenna 100 to be calibrated using a simply configured calibration measurement system.

Third Embodiment

Figure 5:
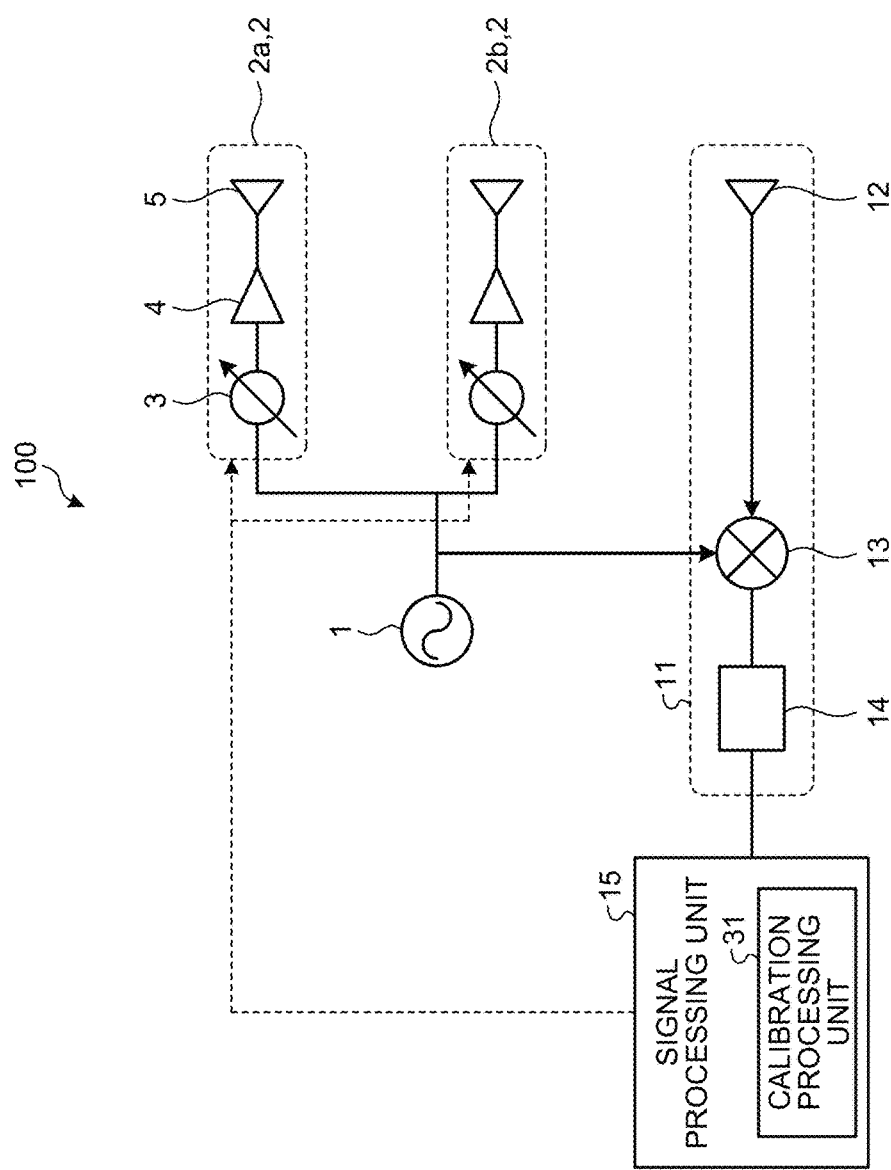
FIG. 5 is a diagram illustrating a phased array antenna calibration measurement system according to a third embodiment.

FIG. 5 is a diagram illustrating a phased array antenna calibration measurement system according to a third embodiment. The calibration measurement system for the phased array antenna 100 according to the third embodiment differs from the calibration measurement system for the phased array antenna 100 according to the first embodiment in that a reflector 22 is also used in addition to the reflector 21. When the installation position of the reflector 21 is referred to as a first position, and the installation position of the reflector 22 is referred to as a second position, the distance between the phased array antenna 100 and the first position is greater than the distance between the phased array antenna 100 and the second position.

For example, the reflector 21 is located at a position 1000 wavelengths or more away from the phased array antenna 100, while the reflector 22 is located at a position 60 wavelengths or more and 500 wavelengths or less away from the phased array antenna 100. Note that the term "one wavelength" refers to the wavelength in free space at the frequency of the radio wave transmitted and received by the phased array antenna 100. Note also that the distances between the installation positions of the reflectors 21 and 22 and the phased array antenna 100 are not limited to the exemplified distances.

A greater difference between the distance between the phased array antenna 100 and the reflector 22 and the distance between the phased array antenna 100 and the reflector 21 provides higher accuracy of phase calibration. Nevertheless, a longer distance between the phased array antenna 100 and the reflector 21 results in a larger calibration measurement system in size. Thus, a longer distance between the phased array antenna 100 and the reflector 21 is preferable to increase accuracy of phase calibration, however within range of availability of space for installation of the calibration measurement system for the phased array antenna 100. As one example, use of a distance between the phased array antenna 100 and the reflector 21 equivalent to 1000 wavelengths or more of the radio waves transmitted from the transmission modules 2 can increase accuracy of phase calibration.

In the third embodiment, the phased array antenna 100 includes two of the transmission modules 2. The two transmission modules 2 may hereinafter be individually denoted as transmission modules 2a and 2b for distinction. It is sufficient that the phased array antenna 100 include at least two of the transmission modules 2, and the number of the transmission modules 2 is not limited to two.

First, calibration is performed in a manner similar to the first and second embodiments with installation of only the reflector 21 and without installation of the reflector 22. This operation is herein referred to as Procedure 1. As described in the first embodiment, a radio wave is transmitted from only one of the transmission modules 2, and the reflected wave reflected by the reflector 21 is received by the reception module 11 to measure a power of the reflected wave. Measurement of the power enables the amplitude to be estimated. Thus, a method for obtaining the phase will next be described.

Figure 6:
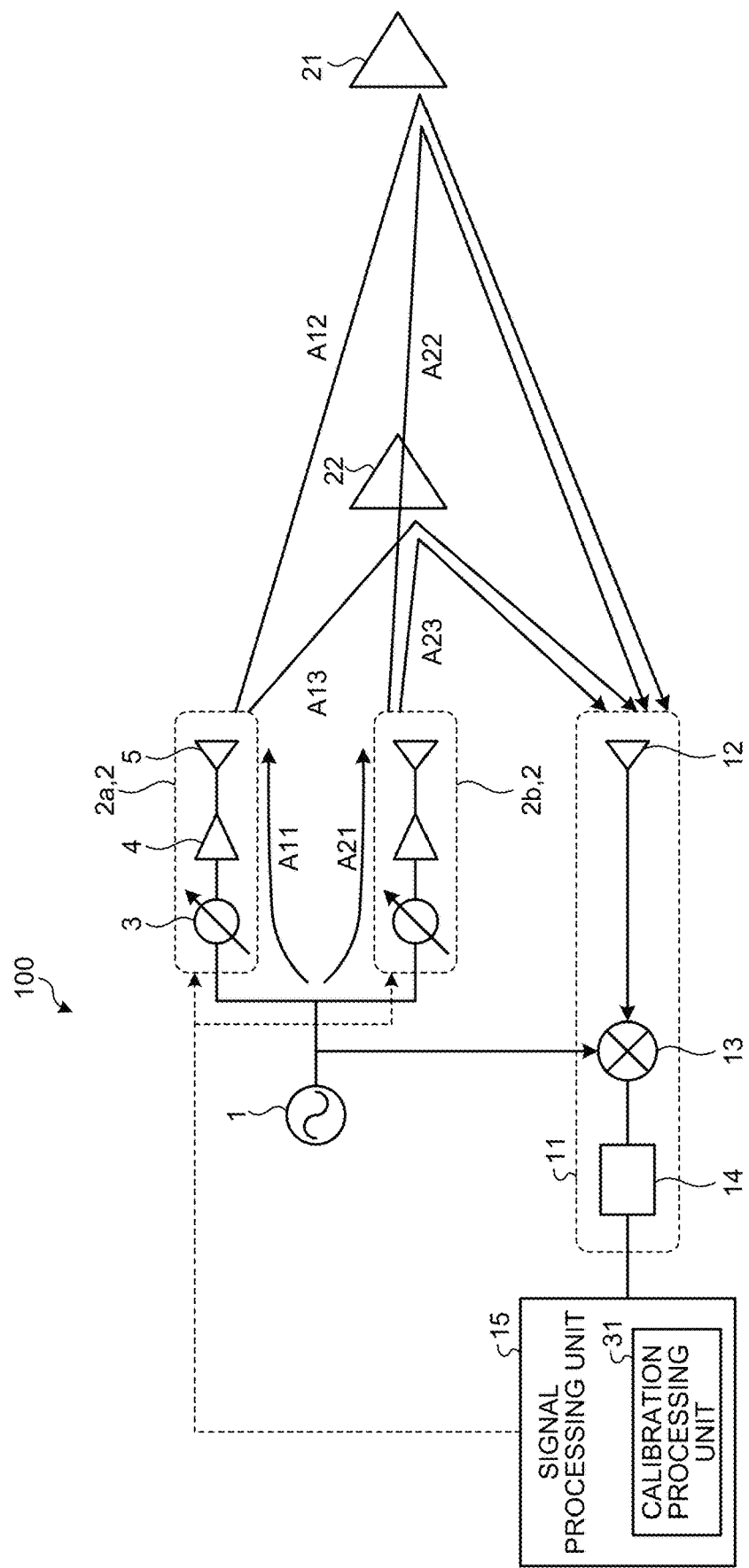
FIG. 6 is a diagram illustrating paths of radio waves within a space in the phased array antenna calibration measurement system according to the third embodiment.

FIG. 6 is a diagram illustrating paths of radio waves within a space in the phased array antenna calibration measurement system according to the third embodiment. As illustrated in FIG. 6, the path from the signal source 1 to the transmission position of the transmission module 2a is denoted by A11. In addition, the total path in a space between the transmission module 2a and the reflector 21 and between the reflector 21 and the reception antenna 12 is denoted by A12. Moreover, the path from the signal source 1 to the transmission position of the transmission module 2b is denoted by A21. Furthermore, the total path in a space between the transmission module 2b and the reflector 21 and between the reflector 21 and the reception antenna 12 is denoted by A22. The changes in phase (phase changes) in the respective paths A11, A12, A21, and A22 are respectively denoted by P11, P12, P21, and P22. Note that the phase changes P12 and P22 each include a phase change due to reflection on the reflector 21.

The phase change determined by Procedure 1 is P11+P12 for the transmission module 2a, and P21+P22 for the transmission module 2b. The path A12 and the path A22 are illustrated as different from each other in FIG. 6 due to limited illustration space. However, since the reflector 21 is placed far in fact, the path A12 and the path A22 can therefore be considered as having a same length when the reflector 21 and the phased array antenna 100 face each other. Similarly, the path A12 and the path A22 can be considered as having a same incident angle with respect to the reflector 21, and can also be considered as exhibiting a same behavior caused by reflection on the reflector 21. The phase change P12 along the path A12 and the phase change P22 along the path A22 can therefore be considered as the same as each other, and no phase difference is caused by the interspace. That is, no phase difference is caused by the geometric relationship among the transmission antennas 5, the reflector 21, and the reception antenna 12 in Procedure 1. Thus, in Procedure 1, relative values of the phase changes P11 and P21 can be calculated without being subjected to the effect of the interspace.

Note that when the path A11 and the path A21 are longer than the wavelengths of the radio waves, the phase changes P11 and P21 have multi-cycle phase rotations. Meanwhile, the estimated phase ranges within ±180°. Thus, the phase change P11 and the phase change P12 may include a difference (a gap) of integer multiple of one wavelength, but as long as the transmission module 2a and the transmission module 2b are in phase with each other, the calibration processing unit 31 can calibrate the phased array antenna 100. Accordingly, a difference (a gap) of integer multiple of one wavelength in the phase change P11 and in the phase change P12 does not cause a problem.

Next, calibration is performed in a manner similar to the first and second embodiments with installation of only the reflector 22 and without installation of the reflector 21. This operation is herein referred to as Procedure 2.

As illustrated in FIG. 6, the total path in a space between the transmission module 2a and the reflector 22 and between the reflector 22 and the reception antenna 12 is denoted by A13. In addition, the total path in a space between the transmission module 2b and the reflector 22 and between the reflector 22 and the reception antenna 12 is denoted by A23. The phase changes along the respective paths A13 and A23 are respectively denoted by P13 and P23. Note that the phase changes P13 and P23 each include a phase change due to reflection on the reflector 22.

The phase change determined by Procedure 2 is P11+P13 for the transmission module 2a, and P21+P23 for the transmission module 2b. Since the reflector 22 is disposed nearer to the phased array antenna 100 than the reflector 21, the path A13 and the path A23 differ from each other in length. In addition, the incident angle with respect to the reflector 22 of the path A13 and the incident angle with respect to the reflector 22 of the path A23 differ from each other, and accordingly, response caused by reflection on the reflector 22 differs between the path A13 and the path A23. Thus, the phase change P13 along the path A13 and the phase change P23 along the path A23 differ from each other. That is, when the reflector 22 is placed near the phased array antenna 100, a phase difference occurs due to the geometric relationship among the reception antenna 12.

When P12≈P22, the phase difference, denoted by C1, between the transmission module 2a and the transmission module 2b determined by Procedure 1 can be expressed as C1=(P21+P22)−(P11+P12)P21−P11.

Similarly, the phase difference, denoted by C2, between the transmission module 2a and the transmission module 2b determined by Procedure 2 can be expressed as C2=(P21+P23)−(P11+P13).

Thus, C3=C2−C1=P23−P13, where C3 represents the difference between C1 and C2. Since the phase of the transmission module 2b determined by Procedure 2 is P21+P23, subtraction of C3 from P21+P23 is calculated as P21+P23−C3=P21+P13.

When the phase P11+P13 for the transmission module 2a in Procedure 2 and the phase P21+P13 resulting from the above calculation with respect to the transmission module 2b are compared with each other, the phases P11+P13 and P21+P13 both include the value P13. Therefore, the comparison represents a relative relationship between P21 and P11. This series of calculations eliminates the effect (influence) of the interspace in Procedure 2, thereby allowing values to be obtained that have same relative phase values as those of Procedure 1. That is, these calculations can remove the phase difference caused by the geometric relationship among the transmission antennas 5, the reflector 21, and the reception antenna 12, from the phases provided by the transmission modules 2a and 2b measured in Procedure 2.

The phases determined by Procedure 1 and Procedure 2 are subject to a product-to-product variation. Meanwhile, according to the relationship of C3=P23−P13, the value of the phase difference C3 is determined by the geometric relationship among the transmission antennas 5, the reflector 22, and the reception antenna 12, and is thus subject to no product-to-product variation. Accordingly, once the phase differences C1, C2, and C3 are determined in advance by performing Procedure 1 and Procedure 2 for one product, a result corresponding to Procedure 1 without an effect of the interspace can be obtained for another product by performing only Procedure 2 on the another device to determine the phase difference C2, and by using the value of C3 previously determined. That is, once Procedure 1 is performed only on a representative product using the reflector 21, in which the size of the calibration measurement system is increased. In such case, a phase change corresponding to the phase change in Procedure 1 can be obtained by calculation for another product, with high accuracy and without being subjected to the effect of the interspace, by performing only Procedure 2 on the another device using a smaller calibration measurement system including the reflector 22.

As described above, the calibration measurement system for the phased array antenna 100 according to the third embodiment performs correction to remove the phase difference caused by the geometric relationship among the transmission antennas 5, the reflector 22, and the reception antenna 12 from the phase of the reflected wave transmitted from the transmission antenna 5 of each of the transmission modules 2a and 2b and received by the reception antenna 12. The calibration measurement system then adjusts the phase shifter 3 based on the phase of the reflected wave that has been corrected by the correction. Specifically, correction is performed to remove the phase difference caused by the geometric relationship among the reception antenna 12 from the phase of the reflected wave received by the reception antenna 12 when the reflector 22 is placed at the second position, which is nearer to the phased array antenna 100 than the first position, based on the phase of the reflected wave received by the reception antenna 12 when the reflector 21 for reflecting the radio wave transmitted from the transmission antenna 5 is placed at the first position. This enables reduction in size of the calibration measurement system for the phased array antenna 100 without reduction in calibration accuracy.

For example, when the phased array antenna 100 is to be mass-produced, the phased array antenna 100 can be calibrated in such a manner that both Procedure 1 and Procedure 2 are performed only on a representative product of the phased array antenna 100 to determine the values of C1, C2, and C3, and only Procedure 2 is performed on the other products of the phased array antenna 100 to correct the phase using the known value of C3. Thus, the products that undergo only Procedure 2 allow reduction in size of the calibration measurement system for the phased array antenna 100 without reduction in calibration accuracy.

Figure 7:
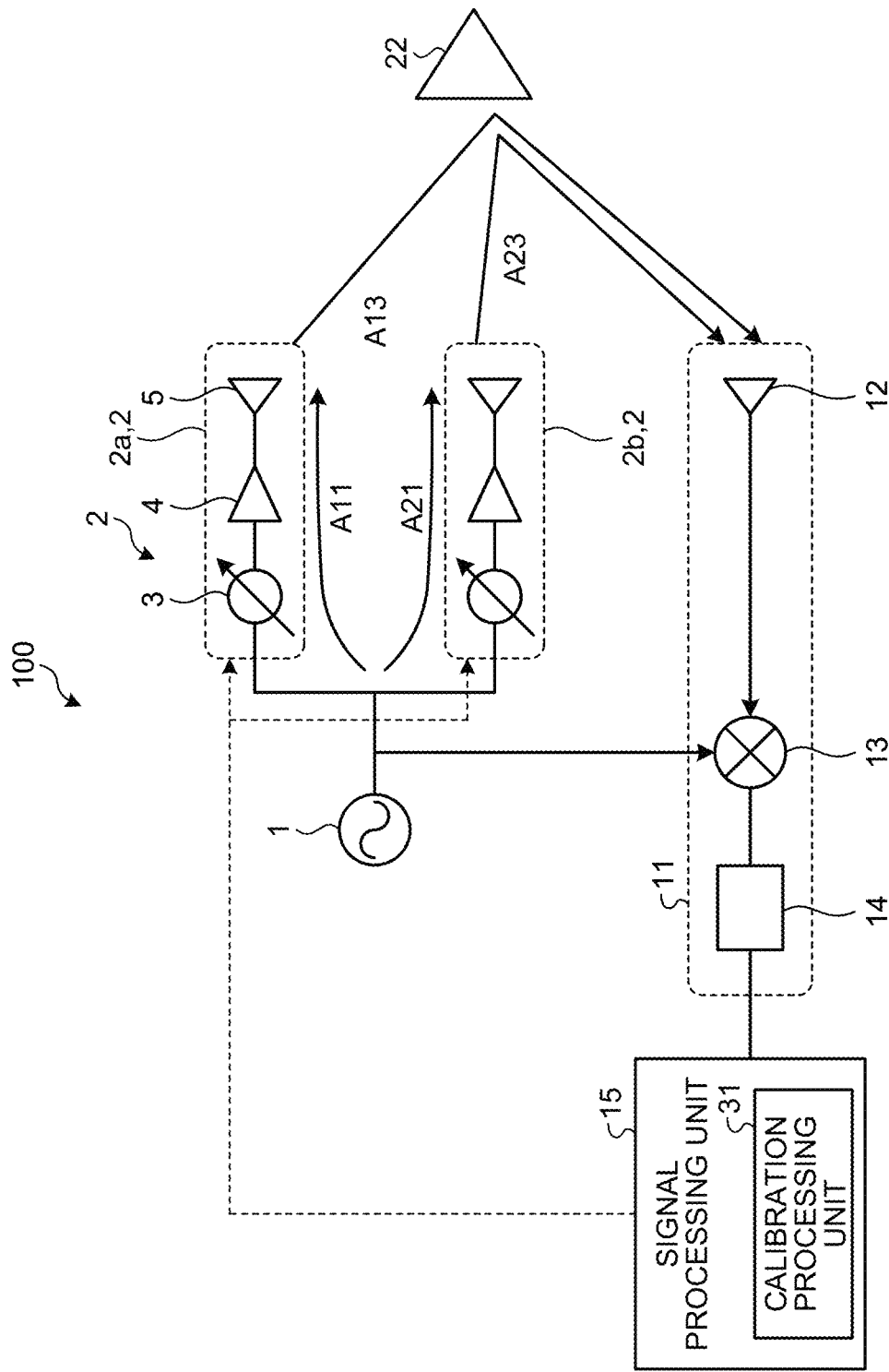
FIG. 7 is a diagram illustrating a phased array antenna calibration measurement system according to a first variation of the third embodiment.

FIG. 7 is a diagram illustrating a phased array antenna calibration measurement system according to a first variation of the third embodiment. This phased array antenna calibration measurement system is similar to the calibration measurement system for the phased array antenna 100 according to the third embodiment except that the reflector 21 is not included. In the first variation of the third embodiment, the difference between P23 and P13, which is the phase difference caused by the geometric relationship among the transmission antennas 5, the reflector 22, and the reception antenna 12, is determined by calculation.

When the frequency of the high frequency signal is known, the values of P23 and P13 can be calculated from the optical path lengths. The values of P23 and P13 can also be calculated based on a result of analysis of electromagnetic field including the reflector 22. The method of calculating P23 and P13 is not limited to a specific method as long as necessary accuracy can be achieved.

A relationship of C4=P23−P13 holds, where C4 represents the difference between P23 and P13 determined by calculation. The use of C4 enables the phased array antenna 100 to be calibrated only by Procedure 2. In the first variation of the third embodiment, this enables reduction in size of the calibration measurement system for the phased array antenna 100 without reduction in calibration accuracy.

Figure 8:
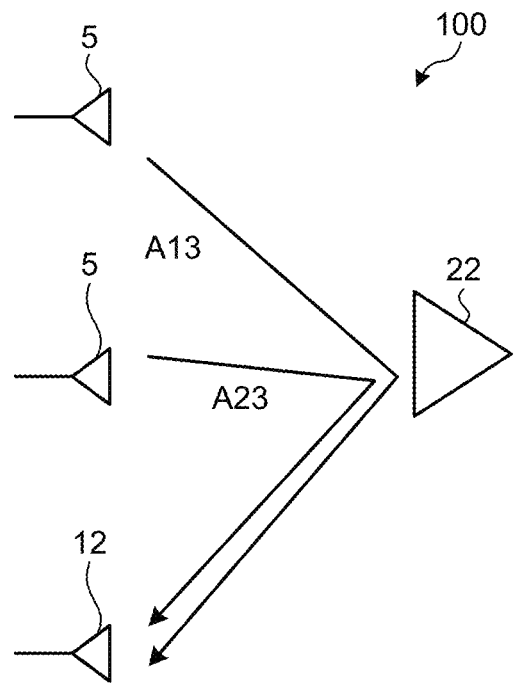
FIG. 8 is a diagram illustrating a phased array antenna calibration measurement system according to a second variation of the third embodiment.

FIG. 8 is a diagram illustrating a phased array antenna calibration measurement system according to a second variation of the third embodiment. In the second variation of the third embodiment, the calibration measurement system for the phased array antenna 100 is constituted by the transmission antennas 5, which are the antennas of the respective transmission modules 2a and 2b, the reception antenna 12, which is the antenna of the reception module 11, of the phased array antenna 100, and the reflector 22. The transmission antennas 5 and the reflector 22 have positional relationships similar to the positional relationships of the calibration measurement system for the phased array antenna 100 according to the first variation of the third embodiment.

In the second variation of the third embodiment, the difference between P23 and P13, which is the phase difference caused by the geometric relationship among the transmission antennas 5, the reflector 22, and the reception antenna 12, is determined by measurement. Measurement values of P23 and P13 can be determined by transmitting a radio wave from each of the transmission antennas 5 and receiving the reflected wave of the radio wave by the reception antenna 12 in a state that a measurement device such as a network analyzer is connected to each of the transmission antennas 5 and the reception antenna 12.

A relationship of C5=P23−P13 holds, where C5 represents the difference between P23 and P13 determined by measurement. The phased array antenna 100 can be calibrated only by Procedure 2 by previously determining the value of C5 in a configuration including only the transmission antennas 5 and the reception antenna 12, assembling the phased array antenna 100 in combination with the phase shifters 3, the amplifiers 4, the mixer 13, the receiver 14, and the signal processing unit 15 to form a calibration system, and performing Procedure 2.

When the phased array antenna 100 is to be mass-produced, the phased array antenna 100 can be calibrated in such a manner that measurement of C5 and Procedure 2 are performed only on a representative product, and only Procedure 2 is performed on the other products to adjust the order value phase using the known value of C5.

The functionality of the calibration processing unit 31 according to the first through third embodiments described above is implemented in a processing circuitry. The processing circuitry may be a dedicated hardware element or a processing unit that executes a program stored in a storage device.

Figure 9:
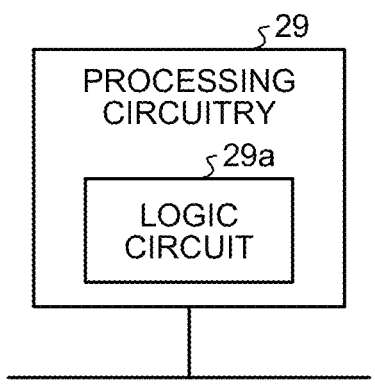
FIG. 9 is a diagram illustrating a configuration in which the functionality of a calibration processing unit according to the first through third embodiments is implemented in a hardware element.

When the processing circuitry is a dedicated hardware element, the processing circuitry may be a single circuit, a set of multiple circuits, a programmed processor, a parallel programmed processor, an application-specific integrated circuit, a field programmable gate array, or a combination thereof. FIG. 9 is a diagram illustrating a configuration in which the functionality of the calibration processing unit according to the first through third embodiments is implemented in hardware. A processing circuitry 29 includes a logic circuit 29a embedded therein that implements the functionality of the calibration processing unit 31.

When the processing circuitry 29 is a processing unit, the functionality of the calibration processing unit 31 is implemented in software, firmware, or a combination of software and firmware.

Figure 10:
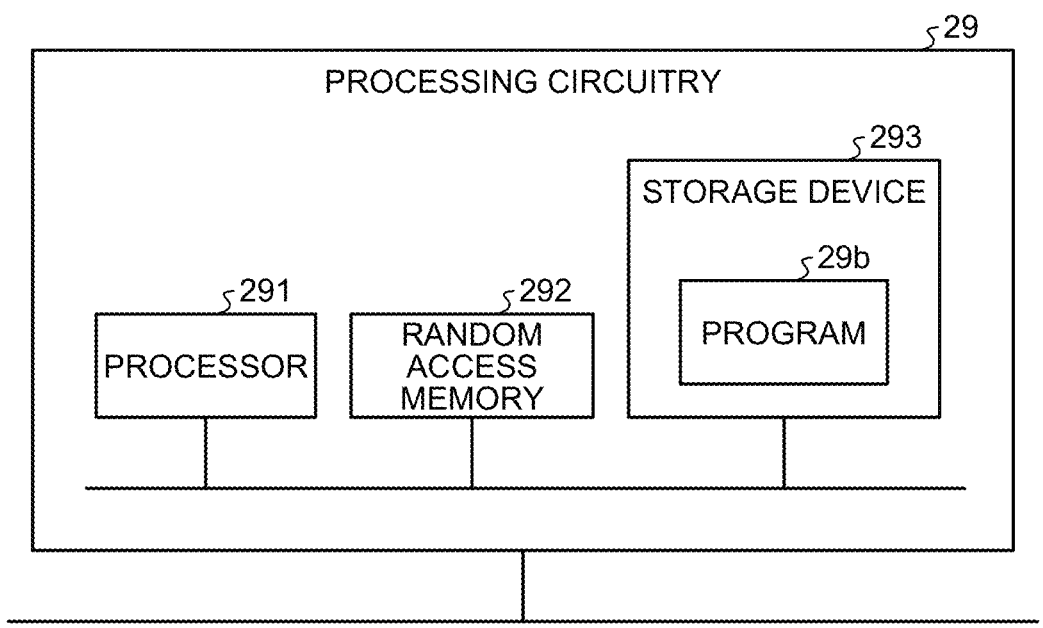
FIG. 10 is a diagram illustrating a configuration in which the functionality of the calibration processing unit according to the first through third embodiments is implemented in software.

FIG. 10 is a diagram illustrating a configuration in which the functionality of the calibration processing unit according to the first through third embodiments is implemented in software. The processing circuitry 29 includes a processor 291, which executes a program 29b, a random access memory 292 to be used by the processor 291 as a work area, and a storage device 293, which stores the program 29b. The functionality of the calibration processing unit 31 is implemented by the processor 291 by loading the program 29b stored in the storage device 293 into the random access memory 292, and executing the program 29b. The software or firmware is described using a program language, and is stored in the storage device 293. The processor 291 is, for example but not limited to, a central processing unit. The storage device 293 may be a semiconductor memory such as a random access memory (RAM), a read-only memory (ROM), a flash memory, an erasable programmable read-only memory (EPROM), or an electrically erasable programmable read-only memory (EEPROM) (registered trademark). The semiconductor memory may be a non-volatile memory or a volatile memory. The storage device 293 may also be, instead of being a semiconductor memory, a magnetic disk, a flexible disk, an optical disk, a compact disc, a MiniDisc, or a digital versatile disc (DVD). Note that the processor 291 may output data such as a computation result to the storage device 293 to store the data in the storage device 293, or store the data in an auxiliary storage device (not illustrated) via the random access memory 292. Integration of the processor 291, the random access memory 292, and the storage device 293 in a single chip allows the functionality of the calibration processing unit 31 to be implemented in a microcomputer.

The processing circuitry 29 implements the functionality of the calibration processing unit 31 by reading and executing the program 29b stored in the storage device 293. It can also be said that the program 29b causes a computer to perform a procedure and a method for implementing the functionality of the calibration processing unit 31.

Note that the processing circuitry 29 may implement the functionality of the calibration processing unit 31 partially in a dedicated hardware element and partially in software or firmware.

As described above, the processing circuitry 29 can implement the foregoing functionality in hardware, software, firmware, or a combination thereof.

The configurations described in the foregoing embodiments are merely examples of various aspects. These configurations may be combined with a known other technology, and moreover, a part of such configurations may be omitted and/or modified without departing from the spirit.

REFERENCE SIGNS LIST

1 signal source; 2, 2a, 2b, 2c, 2d transmission module; 3 phase shifter; 4 amplifier; 5 transmission antenna; 11 reception module; 12 reception antenna; 13 mixer; 14 receiver; 15 signal processing unit; 21, 22 reflector; 29 processing circuitry; 29a logic circuit; 29b program; 31 calibration processing unit; 100 phased array antenna; 291 processor; 292 random access memory; 293 storage device.

The invention claimed is:

1. A phased array antenna calibration method for a phased array antenna including a plurality of transmission modules and a reception module, the plurality of transmission modules each including a phase shifter that changes a phase of a high frequency signal output from a signal source, an amplifier that amplifies an amplitude of the high frequency signal, and a transmission antenna that converts the high frequency signal into a radio wave, the reception module including a reception antenna, the phased array antenna calibration method comprising:

receiving, by the reception antenna, a reflected wave that is a radio wave transmitted from the transmission antenna of each of the plurality of transmission modules and reflected outside the phased array antenna;

measuring a first phase difference in the reflected wave in a state that the reflector is placed at a first position; and adjusting the phase shifter and the amplifier of each of the plurality of transmission modules based on an amplitude and a phase of the reflected wave received, wherein the adjusting is performed based on the first phase difference in such a manner that a second phase difference caused by a geometric relationship among the transmission antennas, a reflector, and the reception antenna is removed from a phase of the reflected wave in a state that the reflector is placed at a second position nearer to the phased array antenna than the first position.

2. The phased array antenna calibration method according to claim 1, wherein the first phase difference in the reflected wave received by the reception antenna in the state that the reflector is placed at the first position is measured in advance using another phased array antenna and the reflector.

3. A calibration system comprising:

a phased array antenna; and a reflector, the phased array antenna including a plurality of transmission modules, a reception module, and calibration processing circuitry, the plurality of transmission modules each including a phase shifter that changes a phase of a high frequency signal output from a signal source, an amplifier that amplifies an amplitude of the high frequency signal, and a transmission antenna that converts the high frequency signal into a radio wave, the reception module including a reception antenna, the calibration processing circuitry being configured to adjust the phase shifter and the amplifier, and the reflector being configured to reflect the high frequency signal, wherein the calibration processing circuitry performs correction in such a manner that a second phase difference caused by a geometric relationship among the transmission antennas, a reflector, and the reception antenna is removed from a phase of a reflected wave in a state that the reflector is placed at a second position nearer to the phased array antenna than a first position, based on a first phase difference of the reflected wave transmitted from the transmission antenna of each of the plurality of transmission modules, reflected by the reflector, and received by the reception antenna in a state that the reflector is placed at the first position.

* * * * *